Jan. 22, 1935.  G. W. WALDO  1,988,674
INTERNAL COMBUSTION ENGINE
Filed Aug. 9, 1929  4 Sheets-Sheet 3
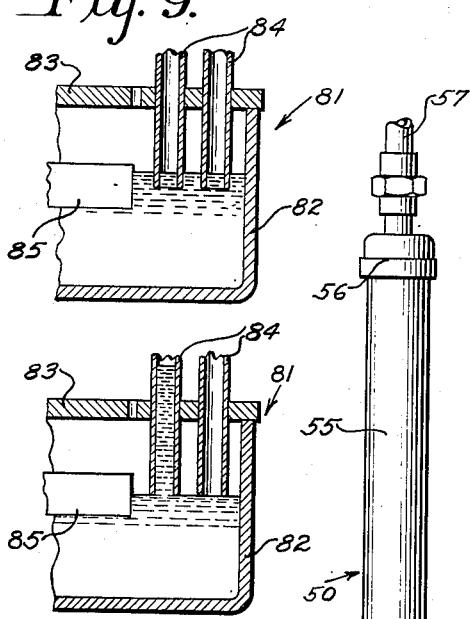
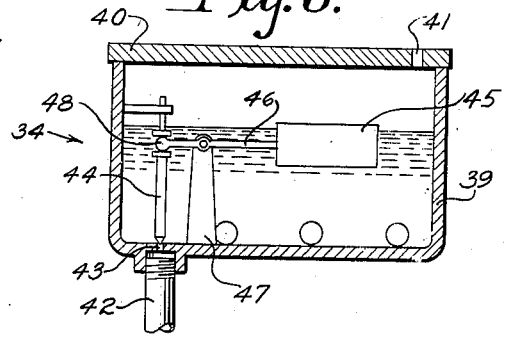
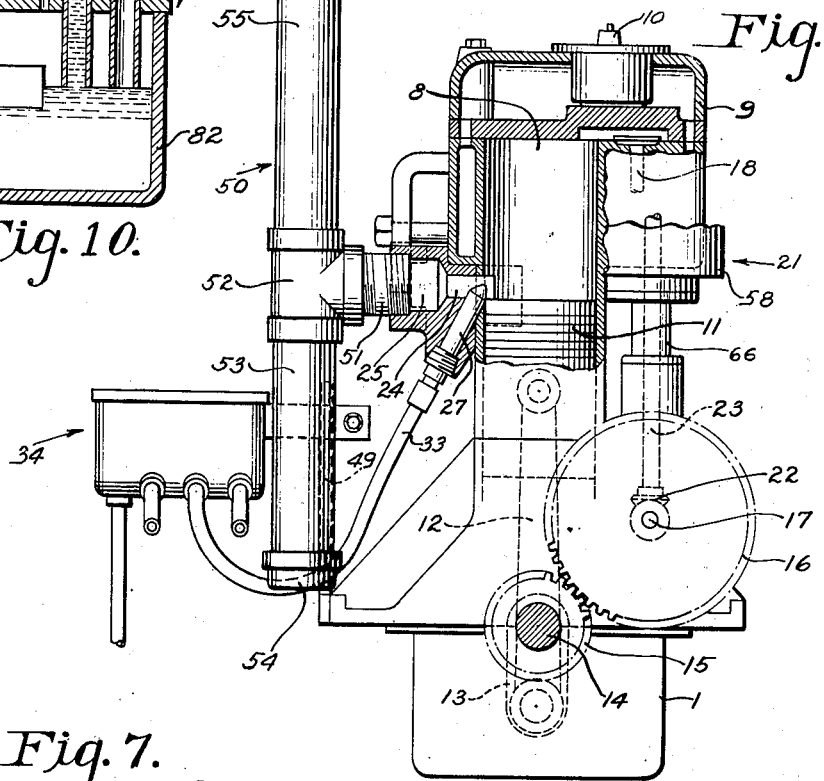
Inventor
George W. Waldo.
by Walter P. Gill
Attorney Inventor
George W. Waldo.
by Walter J. Gill,
Attorney Patented Jan. 22, 1935

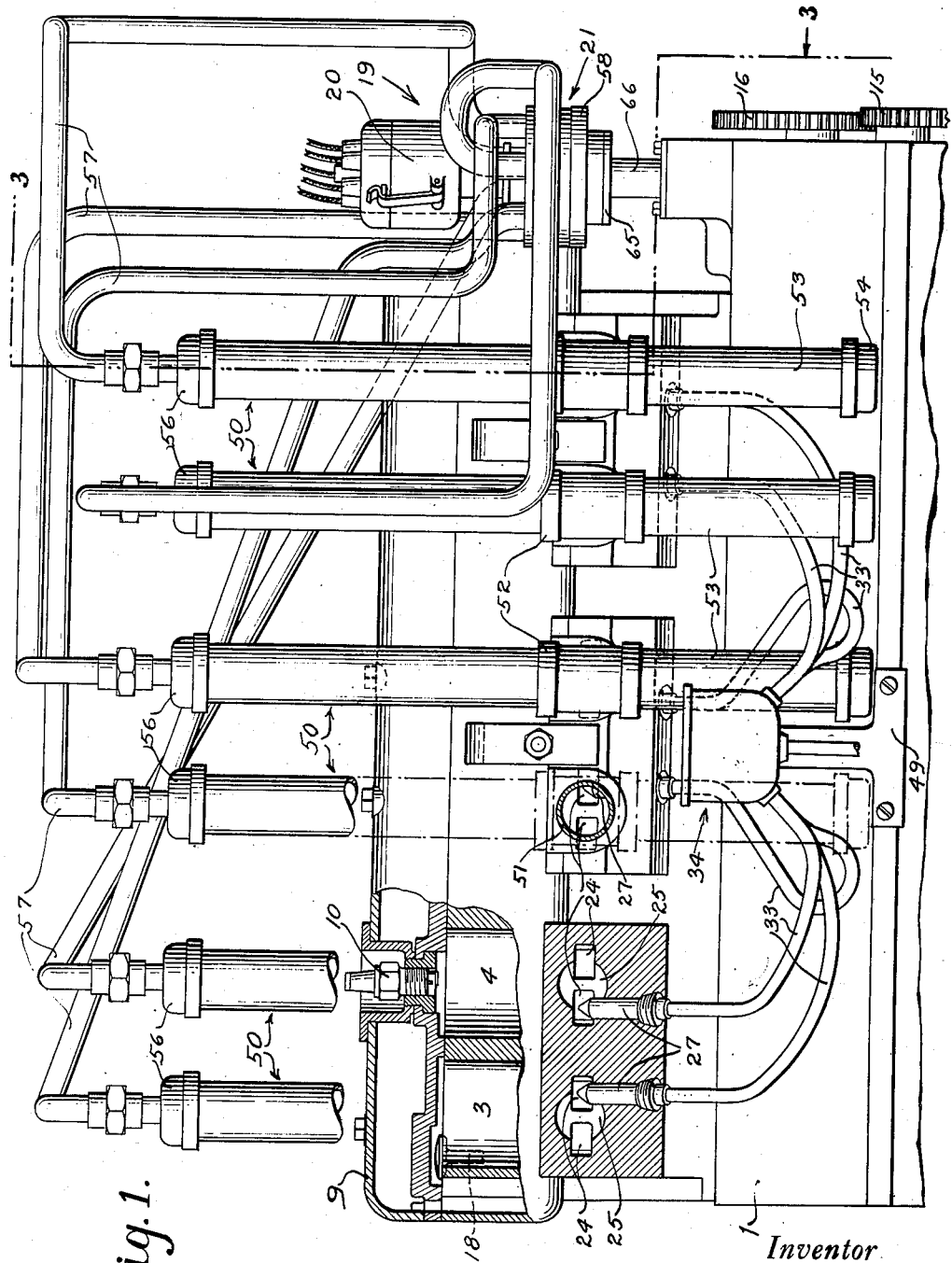

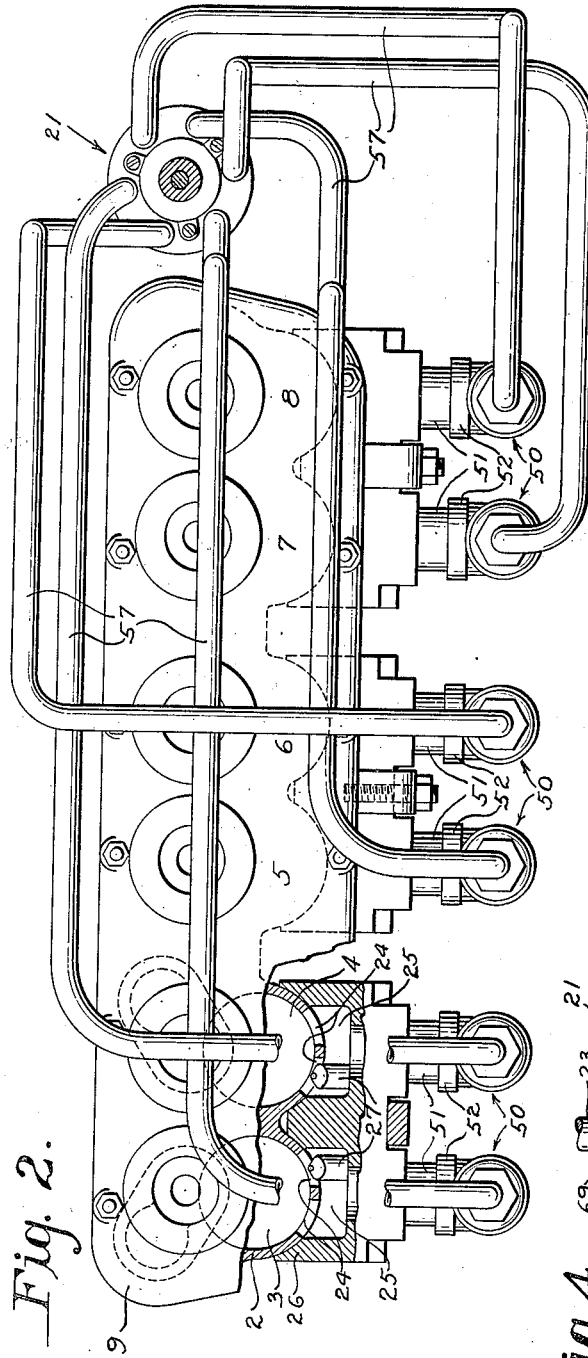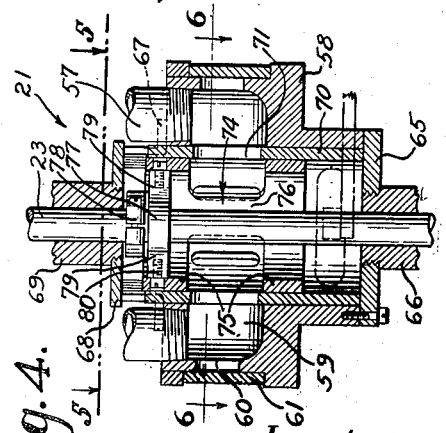

1,988,674

UNITED STATES PATENT OFFICE 1,988,674

INTERNAL COMBUSTION ENGINE

George W. Waldo, Brooklyn, N. Y.

Application August 9, 1929, Serial No. 384,691

19 Claims. (Cl. 123—75)

This invention relates to internal combustion engines and particularly to engines of the four-cycle type.

The action of internal combustion engines of the types at present in use, in which gasoline and kindred fuels are burned does not permit of the maximum economy of fuel because the mixture of air and fuel cannot, after ignition, be properly expanded within the available space within the cylinders. This is due to the fact that the entire cylinder space is filled with the fuel mixture at atmospheric pressure before compression and ignition take place. Such a quantity of gas after compression and ignition requires a much larger space in which to expand efficiently. The rate of change of volume due to movement of the piston, must be an efficient proportion of the natural and unrestricted rate of expansion of the gas. Otherwise a large proportion of the expansive power of the gas is delivered as heat radiated from the engine cylinder via the cooling system.

It is now the practice, in connection with engines of present day design, to control engine speeds by throttling or varying the quantity of fuel and air mixture admitted to the engine cylinder. Such means of control is inefficient since compression falls off as throttling occurs and the whole process results in a falling off in efficiency as engine speeds are reduced.

Most carbureters and mixing devices in use at the present time depend upon the action of a current of air passed across a small jet which is supplied with fuel from a small constant level reservoir. The fuel issuing from the jet is controlled to some extent by a needle valve. The amount of liquid which issues from the jet depends upon the opening of the needle valve and the suction action of the air current over the jet. After issuing from the jet, the liquid is carried along and mixed with the air current, becoming more or less vaporized according to the grade of fuel used and the temperature obtaining.

If an exceptionally volatile liquid fuel is used in a carbureter or other mixing device, it will be found that a fairly close regulation can be obtained in supplying suitable quantities of fuel for the formation of a dry vapor within the air current passing through the carbureter into the engine. It should be noted however, that the formation of the vapor takes place within the air during its passage into the engine. It is doubtful if any vapor is formed in the carbureter itself. If the proper quantity of fuel is injected into the air current, a dry vapor mixture will be formed, which, if of sufficient quantity, will constitute an explosive and efficient mixture for use within the engine cylinder. Since a dry vapor cannot be condensed under conditions met in gas engine practice as to temperature and pressure changes, it follows that such a mixture will undergo compression without liquefaction of any of the fuel content.

Consider, now, the lower grades of fuel passing through a carbureter or other mixing device. It is found that it is very difficult, even if at all possible to obtain a dry vapor mixture for use in the engine. This is due to the lower vapor pressure of the fuel at atmospheric temperature and pressure and to the inadequate means of the carbureter for injecting the fuel into the air current in proper quantity. Various plans have been proposed for obviating this difficulty, such as heating the carbureter from the exhaust manifold, or breaking up the jet or spray into fine particles. With such methods however, there is no positive way of assuring the production of a dry vapor because there is no means of ascertaining that the particular fuel has been supplied at a sufficient temperature to remain in vapor form in the original quantity throughout the compression stroke of the particular engine. That this condition exists is borne out by the formation of carbon deposits in all gasoline and kindred engines regardless of the most careful carbureter adjustment, such formation being undoubtedly due to combustion of fuel in liquid instead of in vapor or gaseous form. It is also well known that different fuels of a volatile nature, require different carbureter settings, adjustments and attachments. That is to say that no carbureter permits the use of different fuels, without a radical change in the carbureter adjustments and attachments. It may also be stated, in connection with present day engines, that the latter may not be adapted to use with equal facilities, fuels of different characteristics as to heat content, volatility, etc. In most cases engines are designed with a compression ratio suitable for only one kind of fuel. Under present day practice it is impossible to construct an engine with a compression ratio that will permit the use of different fuels with equal efficiencies.

It appears from the foregoing considerations that internal combustion engines of the types at present in use require radical departure, as to the means of charging the cylinders with fuel and air, as to the means of expanding a heated gas, as to the methods of forming fuel vapor so that the existence of a dry vapor will be definitely assured, as to the method of speed control so that maximum efficiency will obtain for all engine speeds, and as to the compression ratio so that any given engine will adapt itself to the use of different fuels with equal efficiency.

I have found that it is possible to reduce the pressure of the air within the cylinders of an internal combustion engine to such a pressure that a compression ratio may be established that permits the use of different fuels with equal efficiency; that the resultant fuel mixture, when compressed and ignited will expand at the most efficient rate; that the speed of the engine may be varied by varying the amount of fuel supplied thus resulting in constant efficiency for all engine speeds, the compression ratio remaining substantially the same throughout all speed variation; that a given quantity of fuel may be metered and injected or admitted in liquid form in suspension in air to the engine cylinder and a dry vapor mixture of fuel and air will be formed due to the low pressure obtaining within the cylinder and that the cooling system required can be much reduced since a greater proportion of the heat content of the fuel is converted to useful effort on the engine piston.

It is accordingly an object of this invention to provide an internal combustion engine which has the following general characteristics:

(a) The cylinder is maintained closed from the atmosphere during the major portion of what is commonly termed the intake stroke, there being no intake valve as usually employed. This action results in a vacuum of high degree which obtains in the cylinder at the end of the so-called intake stroke.

(b) Air is admitted to the engine cylinder substantially at the end of the so-called intake stroke and in a predetermined quantity from a suitably proportioned chamber containing air at atmospheric pressure. The chamber is maintained out of communication with the atmosphere substantially during the whole time of admission of air to the cylinder from the said chamber.

(c) Fuel is sprayed into the air in the cylinder during an appropriate length of time and substantially with the admission of the air to the cylinder.

(d) The compression ratio remains constant for all changes of engine speed. Variation in speed is accomplished by varying the amount of fuel supplied to the engine cylinder. This results in constant efficiency for all variations in engine speeds.

(e) Due to the efficient rate of expansion the amount of engine cooling required is much reduced with resultant reduction in the size and extent of the cooling system.

(f) The engine cylinder may be placed in communication with the atmosphere to the extent that full atmospheric pressure will be admitted without fuel. This results in the ability to use the engine as a powerful air brake if desirable. Or the normal air may be augmented for power purposes by the same means if desired.

(g) The fuel sprayed into the cylinder is completely vaporized due to the low pressure or vacuum obtaining within the cylinder.

The particular nature of the invention as well as other objects and advantages thereof will appear most clearly from a description of a preferred embodiment thereof as shown in the accompanying drawings in which Fig. 1 is an elevation partly in section with certain parts broken away to show more clearly the structure of the engine.

Fig. 2 is a similar view in plan.

Fig. 3 is a transverse elevational view partly in section substantially along the line 3—3 of Fig. 1.

Fig. 4 is an elevation principally in section of the air and fuel timing mechanism along the lines 4—4 of Figs. 5 and 6.

Fig. 5 is a plan view partly in section of the mechanism along the line 5—5 of Fig. 4.

Fig. 6 is a similar view along the line 6—6 of Fig. 4.

Fig. 7 is a longitudinal sectional view of one of the fuel supply nozzles.

Fig. 8 is an elevational sectional view of the form of fuel supply device shown in Figs. 1 and 3.

Figs. 9 and 10 are elevational sectional views of a modified form of fuel supply device showing the fuel at different levels, and Figs. 11 to 16 inclusive are diagrammatic views used in connection with the explanation of the operation of the engine.

Figure 11:
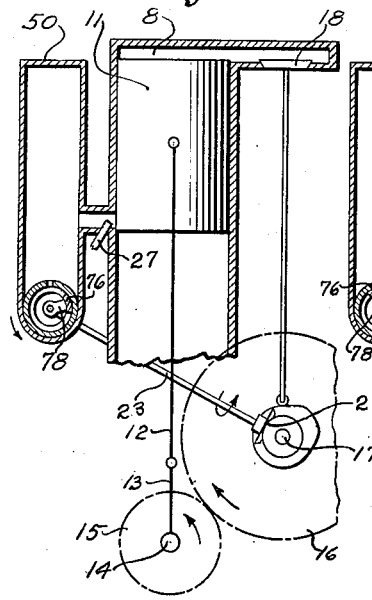
Figure 12:
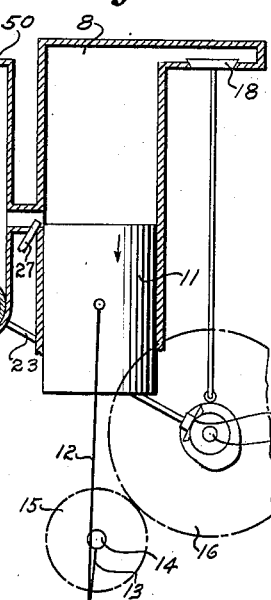

In the drawings 1 is the crank case of the engine above which is the cylinder block 2 containing six cylinders designated 3 to 8 inclusive. The block is surrounded by the usual water jacket 9 which will not be further described since it forms no part of the present invention. Each cylinder has a spark plug 10 and a piston 11 connected by a piston rod 12 to a crank 13 attached to a crank shaft 14 in the crank case 1 and provided at one end of the engine with a pinion 15 meshing with a gear 16 on a shaft 17 from which the usual exhaust valves 18 are operated as well as the combined ignition distributor and air and fuel timing mechanism 19.

The ignition distributor which may be of any suitable construction is designated 20 and the timing mechanism which forms part of this invention is designated 21. Both of these elements are driven from the shaft 17 through a pair of bevel gears 22 and a common shaft 23.

As shown in Figs. 1 and 2 each cylinder is provided at its lower end with a pair of ports 24 opening into a chamber 25 in an extension 26 common to each pair of cylinders. As shown most clearly in Fig. 3 a fuel nozzle 27 for each cylinder is attached to and passes through the corresponding extension 26 with its discharge end located in one of the ports 24 as shown in Figs. 1 and 2.

One of the fuel nozzles is shown in detail in Fig. 7. It consists of boss 28 adapted to be screwed into the wall of the extension to hold the nozzle in place. Attached to the boss is an outer tube 29 to which is attached a tapering cap 30 having an opening at its outer end. The boss is provided with a passage 31 opening to the atmosphere and communicating with the annular space between the outer tube 29 and an inner tube 32 passing through the boss and to the outer end of which is attached a pipe 33 leading to a fuel supply device 34 which will be described in detail hereinafter.

The inner tube is interiorly threaded at its inner end to receive an inner cap 35 having a passage terminating in a gradually tapering portion at its outer end. A perforated diaphragm 36 is also screwed adjustably within the inner tube 32 and is provided with a needle 37 extending through the passage in the inner cap. By adjusting the position of the needle the amount of fuel drawn through the nozzle may be regulated. A perforated spacer ring 38 is fitted between the inner and outer tubes near their outer ends.

Figure 16:
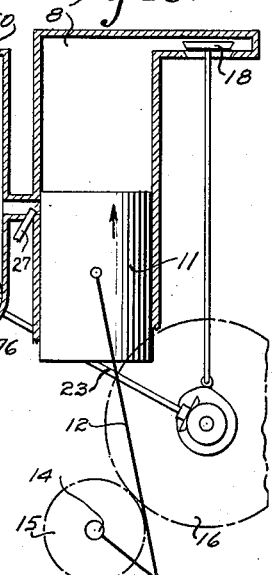

The fuel supply device 34 shown in detail in Fig. 8 consists of a tank 39 provided with a cover 40 having a vent 41. Fuel is supplied to the tank herein as mounted on the shaft 17. The piston then ascends on its exhaust stroke as indicated in Fig. 16 after which the cycle of operations is repeated.

In the normal operation of the engine the sleeve 61 occupies the position shown in Fig. 6 with its ports 62 out of registry with the ports 60 of the chambers 59 of the air and fuel timer mechanism. By manipulation of the rod 64 and arm 63 the sleeve may be turned to bring its ports into complete registry with those of the chambers so that air at atmospheric pressure may enter the chambers 55 through the pipes 57 and then flow into the cylinders as the ports 24 are uncovered. The free admission of air at atmospheric pressure to the cylinders while their ports 24 are uncovered will fill them with air at this pressure which will be subsequently compressed by the pistons to serve as a brake. As the air enters the cylinders at atmospheric pressure while the ports are uncovered there will be little or no fuel drawn in through the nozzles 27.

When the ports 62 of the sleeve 61 are only partly in registry with the ports 60 the supply of air admitted to the cylinder through them may be used to augment the supply of air normally admitted to the cylinders for power purposes.

In order to possess the maximum usefulness there must be a flexibility of control in accordance with speed and power requirements. The adjustable timer ring 70 is provided for this purpose. It may be turned in either direction by rod 73 and arm 72. Assuming that timer valve member 74 rotates counter clockwise as viewed in Figs. 5 and 6 and that the timer ring is turned in the same direction the trailing edge of the portion 76 of the member 74 will be delayed in uncovering the port of the timer ring and the opening of the corresponding chamber 50 to the atmosphere will also be delayed, so that the low pressure conditions therein will be maintained longer. On the other hand if the timer ring be moved in the opposite direction the uncovering of the ports therein by the trailing edge of the portion 76 will be advanced so that air will enter the chamber 50 earlier than before and thus stop the fuel flow earlier in the movement of the piston. The timer ring may be adjusted with the engine running from a position where chamber 50 is closed off from the atmosphere during the entire time that the piston 11 is passing port 24 both down and up to a position where the chamber 50 is open to the atmosphere during all the time of the movement of the piston past the port. With chamber 50 open to the atmosphere during the whole of the movement of the piston past the port no fuel will enter the cylinder from nozzle 27. The air which enters the cylinder under this condition is adapted to exert a braking effect in addition to that which may be obtained by adjustment of the sleeve 61 as above described.

In Figs. 9 and 10 is shown a modified form of fuel supply device 81 consisting of a tank 82 provided with a cover 83 through which extend pipes 84 leading to the cylinders of the engine. The level of fluid in the tank is maintained constant by a float 85 controlling a supply valve like that shown in Fig. 8. When suction is applied to one of the pipes by the action of the piston in the cylinder to which the pipe leads the fuel will be drawn into the pipe until the level of fuel falls until the lower end of the pipe is uncovered as shown in Fig. 10. Air will then be drawn into the pipe and carry the fuel in suspension as spray or vapor to the cylinder of the engine. The density of the spray may be governed by the distance the pipes are submerged in the fuel.

While a preferred embodiment of the invention has been shown and described it will be understood that it may be embodied in other forms and that various changes in structural details may be made without departing from the principle of the invention as defined in the appended claims.

It is also to be understood that the parts of the air and fuel timing mechanism described as open to the atmosphere may be connected to another source of pressure such as might be found necessary to maintain the volumetric efficiency of the engine when operated in a rarefied atmosphere

I claim:—

1. In an internal combustion engine, the combination of a cylinder, a piston in the cylinder, a chamber adapted to be placed in communication with the cylinder at a predetermined point of the intake stroke of the piston for furnishing the initial supply of air to the cylinder, means for admitting fuel to the cylinder, means for placing the chamber in communication with the atmosphere and means for operating the last named means in timed relation with the piston.

2. In an internal combustion engine of the four-cycle type, the combination of a cylinder, a piston in the cylinder, a chamber adapted to be placed in communication with the cylinder at the end of the intake stroke for furnishing the initial supply of air to the cylinder, means for supplying fuel to the cylinder when it is in communication with the chamber and means for placing the chamber in communication with the atmosphere at a predetermined point of a stroke of the piston.

3. In an internal combustion engine the combination of a cylinder, a piston in the cylinder, an air chamber adapted to be placed in communication with the cylinder at the end of the intake stroke, means for supplying fuel to the cylinder when it is in communication with the chamber, means for placing the chamber in communication with the atmosphere at a predetermined point of a stroke of the piston and means for admitting additional air to the chamber while it is in communication with the cylinder.

4. In an internal combustion engine, the combination of a cylinder, a piston in the cylinder, a chamber adapted to be placed in communication with the cylinder at a predetermined point of the intake stroke of the piston for furnishing the initial supply of air to the cylinder, means for supplying fuel to the cylinder and means operable in timed relation with the piston for placing the chamber in communication with the atmosphere when it is out of communication with the cylinder.

5. In an internal combustion engine, the combination of a cylinder, a piston in the cylinder, an air chamber adapted to be placed in communication with the cylinder at a predetermined point of the intake stroke of the piston, means for supplying fuel to the cylinder, means operable in timed relation with the piston for placing the chamber in communication with the atmosphere when it is out of communication with the cylinder and means whereby the chamber may be placed in communication with the atmosphere when it is in communication with the cylinder.

6. In an internal combustion engine, the combination of a cylinder, a piston in the cylinder, an air chamber adapted to be placed in communication with the cylinder at a predetermined point of the intake stroke of the piston, means for supplying fuel to the cylinder, means operable in by a pipe 42 communicating with the tank through a port 43 controlled by a float valve consisting of a stem 44 having a tapered end adapted to fit into the port. The stem is moved by a float 45 having an arm 46 pivoted on a standard 47 within the tank and connected to the stem by a suitable joint 48. The pipe 33 leading from the nozzle 27 enters the tank at its bottom as do the similar pipes leading to the fuel supply nozzles of the other cylinders. The fuel supply device is adjustably mounted upon a bracket 49 in order to establish the proper relation between the level of the fuel and the suction of the jet.

An air chamber 50 is attached to each of the extensions 26 by a coupling 51. Each chamber consists of a T 52 attached to the coupling, a lower portion 53 closed by a cap 54 and an upper portion 55 provided with a cap 56 to which is connected a pipe 57 leading to the air and fuel timing mechanism 21.

This mechanism is shown in detail in Figs. 4, 5 and 6 and consists of a casing 58 provided with radially disposed chambers 59 corresponding in number to the cylinders and each of which is in communication with one of the air chambers 50 through one of the pipes 57. Each chamber 59 is provided with a port 60 normally closed by a sleeve 61 having ports 62 adapted under certain conditions of operation to be brought into registry with the ports 60 by turning the sleeve by an attached arm 63 operated by a rod 64.

The casing 58 has a bottom 65 to which is attached a stem 66 by which the combined ignition distributor and air and fuel timing mechanism 19 is mounted on the engine as shown most clearly in Figs. 1 and 2. The stem also serves as a bearing for the shaft 23 by which the movable elements of the mechanism are operated.

Fastened to the top of the casing by brackets 67 is a cover 68 to which is attached a stem 69 which supports the distributor 20 and also serves as a bearing for the shaft 23. The brackets 67 are spaced from each other to provide ports through which air may enter the interior of the casing 58.

Within the casing is an adjustable timer ring 70 provided with ports 71 serving to establish communication between the interior of the casing and each of the chambers 59. The ring may be turned within the casing by an arm 72 projecting through a slot in the lower part of the casing and connected to an operating rod 73. The ring 70 should fit closely enough within the casing to provide a substantially air tight joint.

Within the ring 70 is a rotable timer valve member 74 consisting of two annular end portions 75 connected by a portion 76 coacting with the ports 71 in the timer ring 70 to successively close them as the valve member rotates. The portions of the valve member are fitted closely within the timer ring to provide a substantially air tight joint. The valve member is rotated by shaft 23 by means of a member 77 having a split hub 78 clamped to the shaft and two arms 79 extending from the hub and connected to the valve member 74 by screws 80 passing through holes in the upper annular portion 75.

The operation of the engine will be described principally in connection with Figs. 11 to 16 inclusive in which only certain elements have been shown and for simplicity the air and fuel timing mechanism has been shown as if incorporated in the air chamber 50 of the cylinder 8 selected for these figures.

In Fig. 11 the piston is shown in the position it occupies at the beginning of the intake stroke and the interior of the air and fuel timing mechanism is represented as being in communication with the air chamber of the cylinder through port 71 which is uncovered as the portion 76 of the timer valve member occupies the position shown at this stage of the operation. Since the interior of the mechanism is always in communication with the atmosphere through the spaces between the brackets 67 there will in the actual engine be communication with the atmosphere through the port 71, chamber 59 and pipe 57 leading to the air chamber 50 so that the latter will be filled with air at atmospheric pressure. It will be understood that the timer valve member is driven from the shaft 14 through the gears 15 and 16, shaft 17, bevel gears 22 and shaft 23 in timed relation to the movement of the piston.

The piston moves downward during the intake stroke and just before it uncovers the port 24 the portion 76 of the timer mechanism closes the port 71 to cut off communication between the chamber 50 and the atmosphere. The piston then uncovers the port 24 and reaches the position shown in Fig. 12. Communication will then be established between the cylinder and chamber 50 and air at atmospheric pressure will enter the cylinder. Since in the embodiment of the invention illustrated the volume of the cylinder is substantially the same as that of the chamber and its connections to the air and fuel timing mechanism, the cylinder will then be filled with air at substantially one-half atmospheric pressure. At the same time the reduced pressure in the cylinder will cause fuel to flow from the supply device 34 through the corresponding pipe 53 and inner tube 32 of nozzle 27. The perforated diaphragm 36 and the needle 37 are suitably adjusted to govern the flow of fuel from the tapering passage in the cap 35 from which it issues as a spray. At the same time air enters this space between the outer and inner tubes through the passage 31 and passes through the perforated spacer ring 38 and the space between the cap 30 and inner cap 35 from which it is discharged with the fuel which is in an atomized condition. The vacuum existing in the cylinder at the end of the suction stroke vaporizes the fuel as it enters the cylinder.

Figure 13:
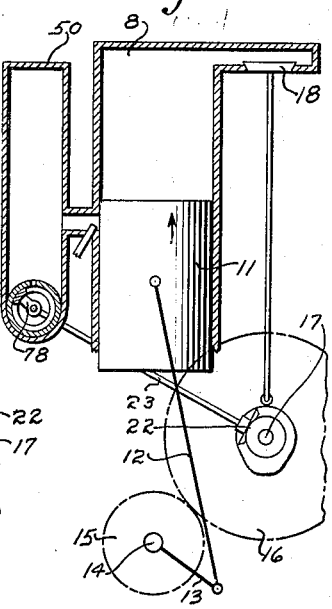
Figure 14:
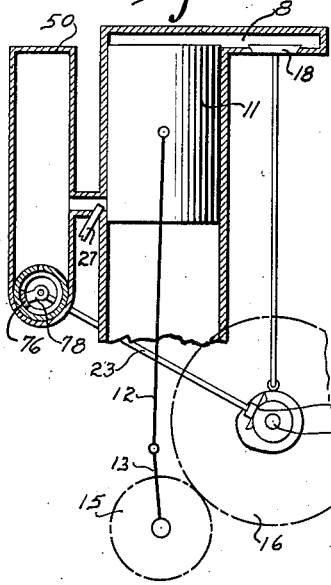
Figure 15:
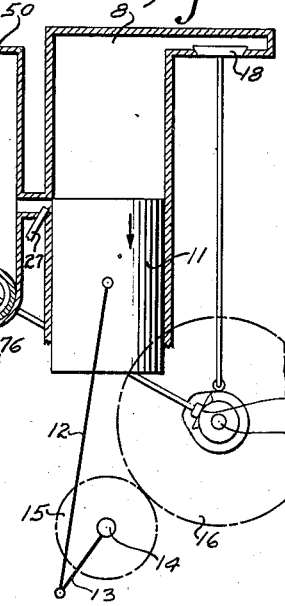

The piston then moves upwardly on its compression stroke and as indicated in Fig. 13 closes the port 24 to cut off communication between the cylinder and chamber 50. At this time the portion 76 of the timer mechanism opens the port 71 so that air at atmospheric pressure again fills the chamber 50 through the corresponding pipe 57 leading from the chamber 59 of the mechanism. The entrance of air at atmospheric pressure into chamber 50 prevents further fuel from being discharged from the jet 27. The piston continues until it has reached the upper limit of its compression stroke as indicated in Fig. 14 whereupon the charge of compressed air and fuel vapor is fired in the usual manner and the piston descends on its working stroke as indicated in Fig. 15.

Since the chamber 50 is throughout the compression and working strokes in communication with the atmosphere the uncovering of the port 24 at the end of the working stroke will permit air from the chamber to enter the cylinder, but as the latter is filled with the products of combustion the pressure therefrom will prevent any fuel from being drawn into the cylinder through the nozzle 27. When the piston reaches the end of its working stroke the exhaust valve 18 is opened by the usual cam provided for this purpose and shown timed relation with the piston for placing the chamber in communication with the atmosphere when it is out of communication with the cylinder and manually operable means for supplying additional air to the chamber when it is in communication with the cylinder.

7. In an internal combustion engine of the four-cycle type, the combination of a cylinder, a piston in the cylinder, a chamber having a volume bearing a predetermined relation to the volume of the cylinder at the end of the intake stroke, means for placing the chamber in communication with the cylinder at a predetermined point in the intake stroke of the piston for furnishing the initial supply of air to the cylinder, means for supplying fuel to the cylinder when it is in communication with the chamber and means for placing the chamber in communication with the atmosphere at another predetermined point in the stroke of the piston.

8. In an internal combustion engine, the combination of a cylinder, a piston in the cylinder, an air chamber having a volume bearing a predetermined relation to the volume of the cylinder at the end of the intake stroke, means for placing the chamber in communication with the cylinder at a predetermined point in the intake stroke of the piston, means for supplying fuel to the cylinder when it is in communication with the chamber, means for placing the chamber in communication with the atmosphere at another predetermined point in the stroke of the piston and manually operable means for increasing the amount of air supplied to the cylinder when it is in communication with the chamber.

9. In an internal combustion engine of the four-cycle type, the combination of a cylinder, a piston in the cylinder, an air chamber having a volume substantially equal to that of the cylinder at the end of the intake stroke, means for placing the chamber in communication with the cylinder at a predetermined point in the intake stroke of the piston, means for supplying fuel to the cylinder when it is in communication with the chamber and means for placing the chamber in communication with the atmosphere at another predetermined point in the stroke of the piston.

10. In an internal combustion engine, the combination of a plurality of cylinders each provided with a piston, a chamber associated with each cylinder and adapted to be placed in communication therewith at a predetermined point in the intake stroke of the corresponding piston for furnishing the initial supply of air to the cylinder, means for supplying fuel to each cylinder when it is in communication with its chamber, and mechanism common to the air chambers and operable in timed relation with the pistons for supplying air to each chamber at another predetermined point in the stroke of the piston in the cylinder associated with the chamber.

11. In an internal combustion engine, the combination of a plurality of cylinders each provided with a piston, an air chamber associated with each cylinder and adapted to be placed in communication therewith at a predetermined point in the intake stroke of the corresponding piston, means for supplying fuel to each cylinder when it is in communication with its chamber, and mechanism common to the air chambers, operable in timed relation with the pistons for supplying air to each chamber at another predetermined point in the stroke of the piston in the cylinder associated with the chamber and means associated with the mechanism for varying the relation between the air supply to each chamber and the point in the stroke of the piston at which air is admitted.

12. In an internal combustion engine, the combination of a plurality of cylinders each provided with a piston, an air chamber associated with each cylinder and adapted to be placed in communication therewith at a predetermined point in the intake stroke of the corresponding piston, means for supplying fuel to each cylinder when it is in communication with its chamber, a pipe leading from each chamber and valve mechanism operable in timed relation with the pistons for successively placing the pipes in communication with the atmosphere at another predetermined point in the stroke of each piston.

13. In an internal combustion engine, the combination of a plurality of cylinders each provided with a piston, an air chamber associated with each cylinder and adapted to be placed in communication therewith at a predetermined point in the intake stroke of the corresponding piston, means for supplying fuel to each cylinder when it is in communication with its chamber, a pipe leading from each chamber and valve mechanism operable in timed relation with the pistons for successively placing the pipes in communication with the atmosphere at another predetermined point in the stroke of each piston and means associated with the mechanism for independently placing the conduits in communication with the atmosphere.

14. In an internal combustion engine of the four-cycle type, the combination of a cylinder provided with a port, a piston in the cylinder, a chamber adapted to be placed in communication with the cylinder through the port at a predetermined point in the intake stroke of the piston for furnishing the initial supply of air to the cylinder, a fuel supply device in the port, a fuel supply reservoir for the device and means for placing the chamber in communication with the atmosphere at another predetermined point in the stroke of the piston.

15. In an internal combustion engine, the combination of a plurality of cylinders each provided with a piston, an air chamber associated with each cylinder and adapted to be placed in communication therewith at a predetermined point in the intake stroke of the corresponding piston, means for supplying fuel to each cylinder when it is in communication with its chamber, a distributor mechanism common to the air chambers for supplying air to each chamber at another predetermined point in the stroke of the piston in the cylinder associated with the chamber and means for operating the distributor and the mechanism is timed relation with the pistons.

16. In an internal combustion engine, the combination of a plurality of cylinders each provided with a piston, an air chamber associated with each cylinder and adapted to be placed in communication therewith at a predetermined point in the intake stroke of the corresponding piston, means for supplying fuel to each cylinder when it is in communication with its chamber, a pipe leading from each air chamber, a valve mechanism consisting of a casing having its interior in communication with the atmosphere and provided with chambers to which the pipes are connected, a timer ring coacting with the chambers and provided with ports communicating with the interior of the casing, a member having a portion coacting with the ports in the timer ring to successively close them and means for rotating the member to thereby successively cut off communication between the atmosphere and the corresponding chamber, pipe and air chamber.

17. In an internal combustion engine, the combination of a plurality of cylinders each provided with a piston, an air chamber associated with each cylinder and adapted to be placed in communication therewith at a predetermined point in the intake stroke of the corresponding piston, means for supplying fuel to each cylinder when it is in communication with its chamber, a pipe leading from each air chamber, a valve mechanism consisting of a casing having its interior in communication with the atmosphere and provided with chambers to which the pipes are connected, said chambers being provided with external ports, a member provided with ports coacting with the last named ports for placing the chambers in communication with the atmosphere, means for adjusting the position of the member, a timer ring within the casing coacting with the chambers and provided with ports communicating with the interior of the casing, means for adjusting the position of the timer ring, a member having a portion coacting with the ports in the timer ring to successively close them and means for rotating the member to thereby successively cut off communication between the atmosphere and the corresponding chamber, pipe and air chamber.

18. The cycle of operation of an internal combustion engine comprising a vacuum creating intake stroke at the termination of which the entire supply of air for combustion is admitted to the cylinder of the engine from a chamber having a predetermined volume together with vaporized fuel, a compression stroke during which the air and vaporized fuel in the cylinder are compressed, a working stroke and an exhaust stroke.

19. In an internal combustion engine of the four-cycle type, the combination of a cylinder, a piston in the cylinder, a source of initial air supply of predetermined volume adapted to be placed in communication with the cylinder during a predetermined interval of time at the termination of the intake stroke of the piston and means for admitting fuel to the cylinder.

GEORGE W. WALDO.